US007727449B2

United States Patent
Lorenz et al.

(10) Patent No.: US 7,727,449 B2
(45) Date of Patent: Jun. 1, 2010

(54) METHOD AND DEVICE FOR PRODUCING FIBER-REINFORCED PLASTIC COMPONENTS

(75) Inventors: Torsten Lorenz, Augsburg (DE); Franz Stadler, Böhmfeld (DE); Stefan Utecht, Kaufering (DE)

(73) Assignee: EADS Deutschland GmbH, Ottobrunn (DE)

( * ) Notice: Subject to any disclaimer, the term of this patent is extended or adjusted under 35 U.S.C. 154(b) by 1781 days.

(21) Appl. No.: 10/845,225

(22) Filed: May 14, 2004

(65) Prior Publication Data

US 2004/0265406 A1    Dec. 30, 2004

Related U.S. Application Data

(63) Continuation of application No. PCT/DE02/04213, filed on Nov. 13, 2002.

(30) Foreign Application Priority Data

Nov. 16, 2001    (DE)    ................. 101 56 123

(51) Int. Cl.
*B29C 70/36*   (2006.01)
*B29C 70/54*   (2006.01)
*B29C 35/02*   (2006.01)

(52) U.S. Cl. .............. 264/258; 264/313; 264/135; 425/504; 425/405.1

(58) Field of Classification Search ............. 264/239, 264/241, 257, 258, 510, 511, 313, 135; 425/405.1, 425/504

See application file for complete search history.

(56) References Cited

U.S. PATENT DOCUMENTS

| 4,942,013 | A | * | 7/1990 | Palmer et al. | 264/511 |
| 5,061,542 | A | * | 10/1991 | Brace | 428/121 |
| 5,106,568 | A | * | 4/1992 | Honka | 264/510 |
| 5,123,985 | A | * | 6/1992 | Evans et al. | 156/213 |
| 5,152,949 | A | * | 10/1992 | Leoni et al. | 264/257 |
| 5,281,388 | A | | 1/1994 | Palmer et al. | |
| 5,576,030 | A | * | 11/1996 | Hooper | 425/112 |
| 6,406,659 | B1 | * | 6/2002 | Lang et al. | 264/510 |

(Continued)

FOREIGN PATENT DOCUMENTS

DE    19915083    4/2000

(Continued)

*Primary Examiner*—Matthew J. Daniels
(74) *Attorney, Agent, or Firm*—Greenblum & Bernstein, P.L.C.

(57) ABSTRACT

Production device and method for producing fiber-reinforced plastic components comprising a semi-finished prepreg product and a dry semi-finished textile product with an aeration and deaeration chamber and an exhaust line opening into the same for producing a vacuum and a semi-finished textile product chamber to receive a dry semi-finished textile product. Into the semi-finished textile product chamber an injection line for inserting resin opens, whereby a prepreg chamber for receiving a semi-finished prepreg product is provided. The prepreg chamber is located against the aeration and deaeration chamber in an air-permeable manner and the semi-finished textile product chamber is located against it at least in areas in an air-impermeable and resin-permeable manner. Due to the air-permeable membranes, a vacuum in the aeration and deaeration chamber generates a vacuum both in the prepreg chamber and in the semi-finished textile product chamber. The instant abstract is neither intended to define the invention disclosed in this specification nor intended to limit the scope of the invention in any way.

25 Claims, 3 Drawing Sheets

U.S. PATENT DOCUMENTS 6,527,894 B1 * 3/2003 Rocker et al. ............... 156/182
6,843,953 B2 * 1/2005 Filsinger et al. ............. 264/510

FOREIGN PATENT DOCUMENTS

| | | | |
|---|---|---|---|
| DE | 19915083 C1 * | 4/2000 |
| DE | 10013409 C1 * | 11/2000 |
| DE | 20102569 | 8/2001 |
| GB | 2351937 | 1/2001 |

* cited by examiner

Fig. 2

Fig. 3

METHOD AND DEVICE FOR PRODUCING FIBER-REINFORCED PLASTIC COMPONENTS

CROSS-REFERENCE TO RELATED APPLICATIONS

The present application is a continuation of International Patent Application No. PCT/DE02/04213, filed Nov. 13, 2002, the disclosure of which is expressly incorporated by reference herein in its entirety. Moreover, the instant continuation application claims priority of German Application No. 101 56 123.7 filed Nov. 16, 2001.

BACKGROUND OF THE INVENTION

1. Field of the Invention

The present invention relates to a method and a device for producing fiber-reinforced plastic components. In particular a semi-finished textile product for producing a planking field and a semi-finished prepreg product for producing a stiffening element for the planking field that can thereby be provided and combined to form the component.

2. Discussion of Background Information

It is known to produce fiber-reinforced plastic components by a so-called prepreg technique. A large-surface skin field is used as a planking field and stiffening profiles are used as integral reinforcement. The skin field can thereby also be produced by automatic placement. However, the method for use with the prepreg technique is disadvantageous in the production of stiffening profiles with non-windable geometry components have to be laminated manually. Such a process that has to be carried out manually increases production costs.

Furthermore, a resin film infusion technique (RFI) is known, e.g., from U.S. Pat. No. 5,281,388, in which a dry fabric is covered with a pre-impregnated resin film in a curing device. The curing device is loaded and evacuated and is subjected to suitable temperature and pressure treatments in an autoclave to cure the fiber-reinforced plastic component.

Furthermore, methods are known in which fiber-composite components are completely prepared as dry semi-finished fiber products initially. The products are subsequently filled with resin and cured in closed or open curing tools through the application of liquid resin injection along with vacuum and/or pressure.

A method for producing fiber-reinforced plastic components with incompletely windable geometry is known from DE 199 15 083 C1 in which the plastic components are formed with a joining of a semi-finished prepreg product and a semi-finished textile product by a resin. The semi-finished prepreg product and the semi-finished textile product are jointly arranged in a flexible vacuum hood. A resin film arranged on the semi-finished textile product is brought to melting under temperature and pressure treatment. The resin film then impregnates and joins the semi-finished textile product and forms a joint between the semi-finished textile product and the semi-finished prepreg product. In this known method, both the semi-finished prepreg product and the semi-finished textile product are jointly and completely enclosed by the flexible vacuum hood and pressurized through evacuation of the same.

Furthermore an arrangement for producing a component comprising a fiber-reinforced material by resin impregnation of a semi-finished fiber product is known from DE 201 02 569 U1, in which the semi-finished fiber product positioned on a mold is pressurized by a vacuum foil with the evacuation of the same. Liquid resin is fed through the vacuum foil to the semi-finished fiber product.

SUMMARY OF THE INVENTION

One aspect of the present invention is to create an improved and cost-effective method for producing fiber-reinforced components. This is attained according to the present invention, through a method for producing fiber-reinforced plastic components comprising a semi-finished prepreg product and a semi-finished textile product in which the semi-finished textile product is impregnated with a resin. Under evacuation of an aeration and deaeration chamber enclosing the semi-finished prepreg product and the semi-finished textile product and sealed airtight against the surroundings in particular by an air-impermeable foil, is joined to the semi-finished prepreg product, and cured. The semi-finished textile product and at least the part of the semi-finished prepreg product to be joined to the semi-finished textile product is enclosed by a semi-finished textile product chamber limited at least in part by a membrane. At least the part of the semi-finished prepreg product not enclosed by the semi-finished textile product chamber is enclosed by a semi-finished prepreg product chamber limited at least in part by a membrane. The resin is injected into the semi-finished textile product chamber, and the semi-finished textile product chamber and the semi-finished prepreg chamber are evacuated via the aeration and deaeration chamber.

Another aspect of the invention includes method for producing fiber-reinforced plastic components comprising a semi-finished prepreg product and a dry semi-finished textile product with an aeration and deaeration chamber with an exhaust line, a prepreg chamber and a semi-finished textile product chamber with an injection line for inserting resin. The method further including positioning the semi-finished prepreg product relative to the dry semi-finished textile product in a predetermined manner to shape the plastic component to be produced. Producing the deaeration chamber, the prepreg chamber, and the semi-finished textile product chamber by membranes and a vacuum foil. Producing a vacuum in the aeration and deaeration chamber by the exhaust line. Curing according to a predetermined temperature and vacuum sequence.

One aspect of the present invention includes a method for producing fiber-reinforced plastic components comprising several semi-finished products, in which the semi-finished products are arranged in a chamber into which resin can be inserted and in which an aeration and deaeration chamber is provided that is delimited from the surroundings with a gas-impermeable foil, from which chamber gas can be withdrawn by an exhaust line. The method including positioning of a semi-finished prepreg product and a dry semi-finished textile product in such a way that the semi-finished products lie adjacent to one another in sections. The method further including formation of a chamber around a semi-finished prepreg product by a gas-permeable membrane that surrounds the chamber at least partly, and formation of a chamber around a dry semi-finished textile product by a gas-permeable membrane that surrounds the chamber at least partly and that adjoins the chamber with the semi-finished prepreg product at least in sections, whereby an injection line for injecting resin opens into the chamber with the semi-finished textile product. The method also including formation of the aeration and deaeration chamber, which is sealed gastight from the surroundings by a foil and that in sections is bounded by the membrane surrounding the chamber with the semi-finished prepreg product, whereby a gas exhaust line opens into the chamber with the semi-finished textile product, so that when air is suctioned out of the aeration and deaeration chamber, air is removed from the chamber with the semi-finished prepreg product as well as from the chamber with the semi-finished textile product. The method including injection of resin into the semi-finished textile product chamber, and evacuation of the aeration and deaeration chamber, so that the semi-finished textile product chamber is evacuated on the path via the semi-finished prepreg product chamber to the aeration and deaeration chamber. Finally, the method including curing of the arrangement of semi-finished prepreg product and semi-finished textile product according to a predetermined temperature course and vacuum course, in order to join the semi-finished prepreg product and the semi-finished textile product together.

The method of the present invention can further include that the semi-finished textile product chamber is arranged inside the semi-finished prepreg product chamber and is enclosed by it, and that the semi-finished prepreg product chamber in turn is arranged inside the aeration and deaeration chamber and is enclosed by it. The method can also include the semi-finished textile product chamber and the aeration and deaeration chamber adjoin each other in sections via a gas-permeable membrane, so that the semi-finished prepreg product chamber and the semi-finished textile product chamber respectively are evacuated directly to the aeration and deaeration chamber. The method can also include the semi-finished prepreg product is provided as an integral stiffening of the fiber-reinforced plastic component to be produced. The method can also include curing of the resin is carried out additionally under pressure in an autoclave. The method can also include the formation of the chambers to shape the plastic component to be produced is provided such that the semi-finished textile product and at least the part of the semi-finished prepreg product to be joined to the semi-finished textile product are enclosed by a semi-finished textile product chamber limited at least partly by a membrane and that at least the part of the semi-finished prepreg product not enclosed by the semi-finished textile product chamber is enclosed by a semi-finished prepreg product chamber limited at least partly by a membrane. The method can also include one or more of the membranes is resin-impermeable. The method further can include one or more of the membranes is resin-permeable.

Another aspect of the invention includes a device for producing fiber-reinforced plastic components comprising a semi-finished prepreg product and a semi-finished textile product (5) is provided, with an aeration and deaeration chamber sealed airtight against the surroundings, in particular by an air-impermeable foil, which chamber surrounds the semi-finished prepreg product and the semi-finished textile product and can be evacuated via an exhaust line. The device includes an arrangement of a semi-finished prepreg product and a dry semi-finished textile product in which the semi-finished products lie adjacent to one another in sections, and a chamber around a semi-finished prepreg product by a gas-permeable membrane that surrounds the chamber at least partly. The device further including a chamber around a dry semi-finished textile product by a gas-permeable membrane that surrounds the chamber at least partly and that adjoins the chamber with the semi-finished prepreg product at least in sections, whereby an injection line for injecting resin opens into the chamber with the semi-finished textile product, and an aeration and deaeration chamber that is sealed gastight from the surroundings by a foil and that is bounded in sections by the membrane surrounding the chamber with the semi-finished prepreg product, whereby a gas exhaust line opens into the chamber with the semi-finished textile product, so that when air is suctioned out of the aeration and deaeration chamber, air is withdrawn from the chamber with the semi-finished prepreg product as well as from the chamber with the semi-finished textile product.

Yet another aspect of the invention includes a device for producing fiber-reinforced plastic components comprising a semi-finished prepreg product and a semi-finished textile product, characterized in that one or more of the membranes is resin-impermeable. The device for producing fiber-reinforced plastic components comprising a semi-finished prepreg product and a semi-finished textile product further can include one or more of the membranes is resin-permeable. The device can further include the semi-finished textile product chamber is arranged inside the semi-finished prepreg product chamber and is enclosed by it. The device can further include that the semi-finished textile product chamber is limited partly by the semi-finished prepreg product.

One particular aspect of the present invention lies in the possibility of a simultaneous use of two resin systems during the combined curing process. In particular, liquid resin systems can be used for the stiffening profiles and prepregs for the planking, in contrast to methods according to the prior art in which only one resin system and only one of the methods cited can be used during the joint combined curing.

In the method according to the present invention, in the case of a planking field, a dry semi-finished textile product can be used for a large-area compared to the semi-finished prepreg product. The semi-finished prepreg product is usually a dry textile fabric provided with resin films. The semi-finished prepreg product, which should preferably be applied to the dry semi-finished textile product for integral stiffening, can be placed in a production device as a dry fabric and positioned on the semi-finished prepreg product. A suitable vacuum can be provided with a vacuum chamber for the subsequent resin injection for the dry textile fabric. After the joining of the semi-finished prepreg product and the dry textile fabric, the chamber is evacuated. Subsequently curing takes place according to a predetermined temperature and vacuum sequence. The curing can additionally be carried out under pressure in an autoclave that particular depends on the material combination that has been used in the method for the prepreg resin and injection resin.

Another aspect of the method according to the invention is that almost any desired combination of resin materials can be selected for practicing the present invention. However, care should be taken to insure that the maximum temperature limit for any one material, e.g., to avoid decomposition, is not exceeded during the process. In particular, very viscous prepreg systems can also be used. In this manner, cost-effective materials can be used, by which production costs can be reduced.

One aspect of the present invention includes a method for producing fiber-reinforced plastic components composed of a semi-finished prepreg product and a semi-finished textile product. The method includes enclosing the semi-finished prepreg product and the semi-finished textile product within an air-impermeable foil to form an aeration and deaeration chamber, enclosing the semi-finished textile product and at least a part of the semi-finished prepreg product to be joined to the semi-finished textile product in a semi-finished textile product chamber limited at least in part by a membrane, and enclosing at least a part of the semi-finished prepreg product not enclosed by the semi-finished textile product chamber in a semi-finished prepreg product chamber limited at least in part by a second membrane. The method can further include curing the semi-finished prepreg product and the semi-finished textile product to join the semi-finished prepreg product to the semi-finished textile product. The method may also include injecting resin into the semi-finished textile product chamber; and evacuating the semi-finished textile product chamber and the semi-finished prepreg product chamber through the aeration and deaeration chamber. The semi-finished textile product chamber can be evacuated through the aeration and deaeration chamber through the semi-finished prepreg product chamber. The method can further include evacuating the semi-finished textile product chamber and the semi-finished prepreg product chamber directly through the aeration and deaeration chamber. The semi-finished textile product chamber can be arranged within the semi-finished prepreg chamber and is enclosed by the semi-finished prepreg chamber, and that the semi-finished prepreg product chamber is arranged within the aeration and deaeration chamber and is enclosed by the aeration and deaeration chamber. The semi-finished textile product chamber and the semi-finished prepreg product chamber can be respectively limited at least in part by the aeration and deaeration chamber. The semi-finished textile product chamber can be limited in part by the semi-finished prepreg product. The fiber-reinforced plastic component can be integrally stiffened by the semi-finished textile product. The fiber-reinforced plastic component can be integrally stiffened by the semi-finished prepreg product. The method can further include curing the resin under pressure in an autoclave. The semi-finished textile product can be impregnated with a resin.

Another aspect of the invention includes a method for producing fiber-reinforced plastic components composed of a semi-finished prepreg product and a dry semi-finished textile product with an aeration and deaeration chamber having an exhaust line, a prepreg chamber, and a semi-finished textile product chamber having an injection line for inserting resin. The method including positioning the semi-finished prepreg product relative to the dry semi-finished textile product to form a predetermined shape of the plastic component to be produced, arranging membranes and a vacuum foil to form the deaeration chamber, the prepreg chamber, and the semi-finished textile product chamber, and producing a vacuum in the aeration and deaeration chamber through the exhaust line. The method can further include injecting resin into the semi-finished textile product chamber. The method can further include curing the semi-finished prepreg product and semi-finished textile product according to a predetermined temperature and vacuum sequence. The semi-finished textile product chamber can be evacuated through the aeration and deaeration chamber through the semi-finished prepreg product chamber.

Another aspect of the invention is a device for producing fiber-reinforced plastic components composed of a semi-finished prepreg product and a semi-finished textile product. The device includes an aeration and deaeration chamber sealed airtight by an air-impermeable foil, a semi-finished textile product chamber formed at least in part by a membrane arranged to enclose the semi-finished textile product and at least a part of the semi-finished prepreg product, a semi-finished prepreg product chamber limited at least in part by a flexible membrane arranged to enclose at least a part of the semi-finished prepreg product not enclosed by the semi-finished textile product chamber, an injection line structured and arranged to inject a resin into the semi-finished textile product chamber, and an exhaust line structured and arranged to evacuate the aeration and deaeration chamber, whereby the semi-finished textile product chamber and the semi-finished prepreg product chamber are evacuated. The membrane limiting the semi-finished prepreg product chamber can be air-permeable to the aeration and deaeration chamber. The membrane limiting the semi-finished textile product chamber can be air-permeable to the semi-finished prepreg product chamber. The membrane limiting the semi-finished textile product chamber can be air-permeable to the aeration and deaeration chamber. The membrane limiting the semi-finished prepreg product chamber can be resin-impermeable. The membrane limiting the semi-finished textile product chamber can be resin-impermeable. The semi-finished textile product chamber can be arranged within and is enclosed by the semi-finished prepreg product chamber. The semi-finished prepreg product chamber can be arranged within and is enclosed by the aeration and deaeration chamber. One of the semi-finished textile product chamber and the semi-finished prepreg product chamber can be respectively limited at least in part by the aeration and deaeration chamber. The semi-finished textile product chamber can be limited in part by the semi-finished prepreg product.

Yet another aspect of the invention is a production device for producing fiber-reinforced plastic components. The device including a semi-finished textile product chamber that receives a dry semi-finished textile product, the semi-finished textile product chamber being formed by a membrane, an injection line structured and arranged to insert resin into the semi-finished textile product chamber, a semi-finished prepreg chamber that receives a semi-finished prepreg product, the semi-finished prepreg chamber being formed by a second membrane, an aeration and deaeration chamber that is structured and arranged to enclose the semi-finished textile product chamber and the semi-finished prepreg chamber, and an exhaust line that is structured and arranged to produce a vacuum in the aeration and deaeration chamber. The membranes can be air-permeable to the aeration and deaeration chamber. The membranes can be resin-impermeable.

Another aspect of the invention is a method for producing fiber-reinforced plastic components. The method including positioning a semi-finished prepreg product and a dry semi-finished textile product such that the semi-finished products are adjacent to one another, forming a chamber around the semi-finished prepreg product with a gas-permeable membrane that at least partially surrounds the chamber, forming a chamber around a dry semi-finished textile product with a gas-permeable membrane that at least partially surrounds the chamber and that adjoins the chamber with the semi-finished prepreg product, forming an aeration and deaeration chamber which is sealed gastight from the surroundings by a foil, injecting resin into the semi-finished textile product chamber, and evacuating the aeration and deaeration chamber so that the semi-finished textile product chamber is evacuated through the semi-finished prepreg product chamber to the aeration and deaeration chamber. The method can further include curing the semi-finished prepreg product and semi-finished textile product according to a predetermined temperature course and vacuum course in order to join the semi-finished prepreg product and the semi-finished textile product together. The aeration and deaeration chamber can be bounded by the membrane surrounding the chamber with the semi-finished prepreg product, whereby a gas exhaust line extends into the chamber with the semi-finished textile product, so that when air is suctioned out of the aeration and deaeration chamber, air is removed from the chamber with the semi-finished prepreg product as well as from the chamber with the semi-finished textile product. The semi-finished textile product chamber can be arranged inside and is enclosed by the semi-finished prepreg product chamber, and that the semi-finished prepreg product chamber is arranged inside and is enclosed by the aeration and deaeration chamber. The semi-finished textile product chamber and the aeration and deaeration chamber can adjoin each other in sections through a gas-permeable membrane, so that the semi-finished prepreg product chamber and the semi-finished textile product chamber respectively are evacuated directly to the aeration and deaeration chamber. The semi-finished prepreg product can be an integral stiffening of the fiber-reinforced plastic component to be produced. The curing of the resin can be carried out additionally under pressure in an autoclave. The semi-finished textile product and at least the part of the semi-finished prepreg product to be joined to the semi-finished textile product can be enclosed by a semi-finished textile product chamber limited at least partly by a membrane and that at least a part of the semi-finished prepreg product not enclosed by the semi-finished textile product chamber is enclosed by a semi-finished prepreg product chamber limited at least partly by a membrane. The membranes can be resin-impermeable. The membranes can be resin-permeable.

Another aspect of the invention is a device for producing fiber-reinforced plastic components. The device including an arrangement of a semi-finished prepreg product and a dry semi-finished textile product in which the semi-finished products are adjacent to one another, a chamber, structured and arranged around a semi-finished prepreg product, is formed by a gas-permeable membrane that surrounds the chamber at least partly, a chamber, structured and arranged around a dry semi-finished textile product, is formed by a gas-permeable membrane that surrounds the chamber at least partly and that adjoins the chamber with the semi-finished prepreg product, an injection line that is structured and arranged to inject resin into the chamber with the semi-finished textile product, and an aeration and deaeration chamber that is sealed gastight by a foil. The aeration and deaeration chamber can be bounded in sections by the membrane surrounding the chamber with the semi-finished prepreg product. The device including a gas exhaust line extends into the chamber with the semi-finished textile product, where when air is suctioned out of the aeration and deaeration chamber, air is withdrawn from the chamber with the semi-finished prepreg product as well as from the chamber with the semi-finished textile product. At lest one of the membranes can be resin-impermeable. At least one of the membranes can be resin-permeable. The semi-finished textile product chamber can be arranged inside and is enclosed by the semi-finished prepreg product chamber. The semi-finished textile product chamber can be limited partly by the semi-finished prepreg product.

DETAILED DESCRIPTION OF THE PRESENT INVENTION

Figure 1:
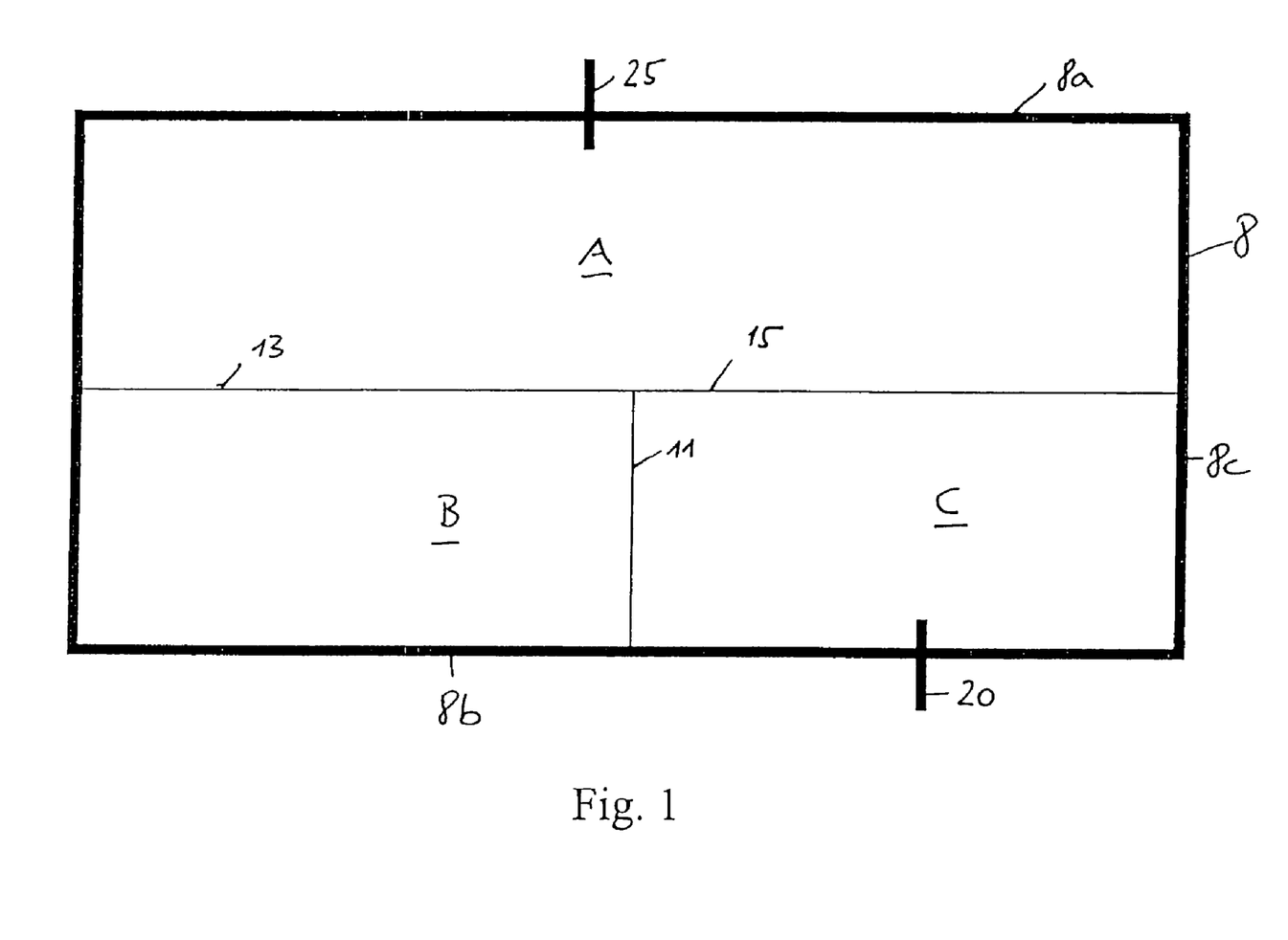
FIG. 1 is a diagrammatic representation of three chambers for producing a combination of a planking field with a stiffening element according to one exemplary embodiment of the invention.

FIG. 1 shows, in diagrammatic form, an aeration and deaeration chamber a provided in a production device according to the present invention or for use with the method according to the present invention. Also shown in FIG. 1 is a semi-finished prepreg product or curing chamber B that will receive a semi-finished prepreg product. Further shown in FIG. 1 is a semi-finished textile product chamber or injection chamber C that will receive a dry semi-finished textile product.

The spatial arrangement of the chambers shown in FIG. 1 is by way of example and can be embodied differently. For example, the injection chamber C can also be arranged inside the curing chamber B. The aeration and deaeration chamber A can also extend further around the chambers B or C than shown in FIG. 1. The aeration and deaeration chamber A can also be formed of several chambers or spaces. In the exemplary embodiment of FIG. 2, the curing chamber B is located next to the semi-finished textile product or injection chamber C separated in sections only by a membrane 11. The curing chamber B also has a common boundary with the aeration and deaeration chamber A in the form of a membrane 13. Optionally the injection chamber C can also feature a common boundary with the aeration and deaeration chamber A in the form of a membrane 15 (not shown in the embodiment of FIG. 2). The membranes 11, 13, 15 are formed of gas-permeable and resin-impermeable or resin-permeable material.

In sections the surface of the semi-finished textile product or the semi-finished prepreg product can also form the boundary of the aeration and deaeration chamber A, the curing chamber B or the injection chamber C, in particular when an edge area of the respective membrane is located on the corresponding semi-finished product.

In summary, in a first form of embodiment the prepreg chamber B is located at least in some areas adjacent the semi-finished textile product chamber C separated by an air-permeable but not necessarily a resin-permeable manner; and the semi-finished textile product chamber C and the prepreg chamber B are located against the aeration and deaeration chamber A by a membrane, whereby a device is provided for feeding the resin into the semi-finished textile product chamber C which is designed such that no ambient air reaches the chamber C in addition to the feed line.

The air-permeability of the membrane between the chambers C, B and A can be produced by the material and alternatively or additionally also be realized by aeration device, such as e.g. by a wall with openings or valves. This also enables a monitoring or control of the air feed between the respective chambers to be achieved.

The chambers A, B, C are arranged such that when air is suctioned from the aeration and deaeration chamber A, air is withdrawn from both chamber B and chamber C.

The chambers A, B and C are vacuum sealed, thus sealed in a gas-impermeable manner from the surroundings either by foils 8, 8a, 8b, and 8c or, in some sections are separated from the surroundings by the sealed application of the corresponding foils 8, 8a, 8b, 8c on a sealed application device.

The aeration and deaeration chamber A is a chamber that is used to receive air and volatile process constituents from the semi-finished prepreg product chamber B and from the semi-finished textile product chamber C. In the exemplary embodiment of FIGS. 1 and 2, the air from the semi-finished textile product chamber C can be brought directly into the aeration and deaeration chamber A via the membrane 15 or via a membrane 11 and the semi-finished prepreg product chamber B. If alternatively the chamber C is located in the chamber B, the air from the chamber C reaches the chamber B via the membrane 11 and from there reaches the chamber A via the membrane 15. The membranes 11, 13, 15 can be formed as resin-permeable or resin-impermeable.

The semi-finished prepreg product chamber B is provided to receive a semi-finished prepreg product, thus a semi-finished fiber product pre-impregnated with resin, e.g., for producing a planking field. According to the invention, no resin is injected into this chamber B, since resin is already present in the prepreg product. In contrast, an injection line 20 extending into the semi-finished textile product chamber C is provided for the introduction of a liquid resin. An assigned resin storage chamber and conveying device for feeding the resin are not shown in the Figures.

Furthermore, a device for producing a vacuum or a vacuum pump is provided that can produce an adjustable vacuum in the aeration and deaeration chamber A via an exhaust line 25 extending into the aeration and deaeration chamber A.

According to the invention, resin is injected into the semi-finished textile product chamber C. During or after the resin injection, a vacuum is created and adjusted in the aeration and deaeration chamber A via the vacuum pump. The amount and time of application of the vacuum depend on various factors such as the material combination provided for the prepreg resin and the injection resin.

Due to the vacuum in the aeration and deaeration chamber A, a suctioning off of gas takes place from the semi-finished textile product chamber C through the membrane 15 and also from the semi-finished prepreg product chamber B through membranes 13 or 11 and 15.

Furthermore, due to the application of the vacuum in the aeration and deaeration chamber A, a degassing of the semi-finished prepreg product located in the semi-finished prepreg product chamber B and thus a curing of the same is effected.

In order to support the injection of resin into the semi-finished textile product chamber C and the curing of the semi-finished textile product then impregnated with resin and of the semi-finished prepreg product in the semi-finished prepreg product chamber B, defined time-dependent, or constant temperatures can be adjusted in one or both chambers B, C. The vacuum in the aeration and deaeration chamber A and the temperatures in the chambers B, C can also be adjusted via temperature control device having an automatic control loop.

Figure 2:
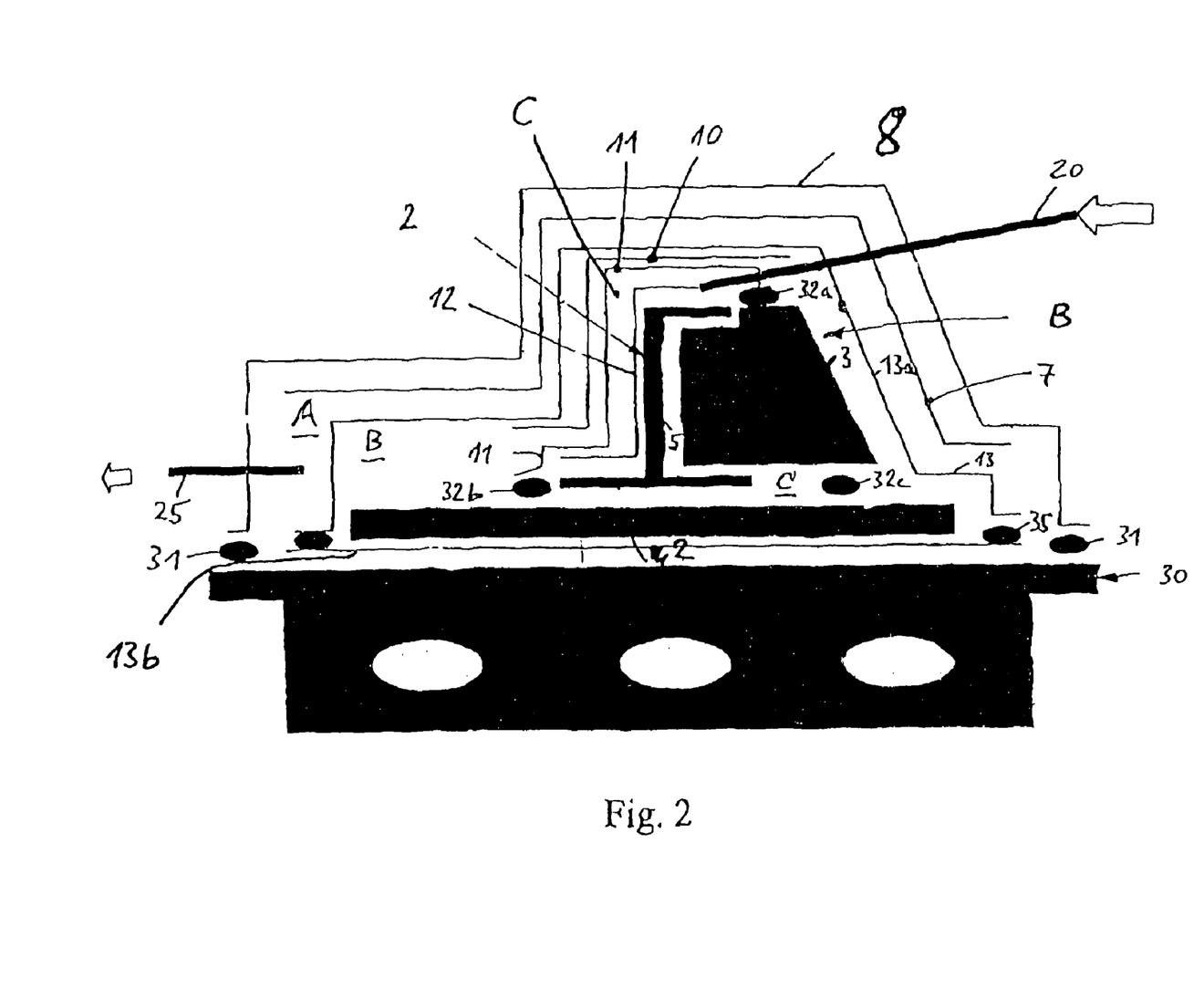
FIG. 2 is an exemplary embodiment of a vacuum device according to the invention for carrying out the method.

FIG. 2 shows an embodiment of the chambers A, B, and C with an initially dry semi-finished textile product 5 and a semi-finished prepreg product 2 in order to produce a planking element with a stiffening from the semi-finished products 5, 2 by the production device.

In the embodiment of FIG. 2, the aeration and deaeration chamber A is bounded in areas by a vacuum foil 8 that seals the aeration and deaeration chamber A from the surroundings. To this end, a sealing band 31 is provided through which the vacuum foil 8 is tightly sealed to corresponding support surfaces of a work piece support 30. Alternatively, the vacuum foil 8 can also enclose the entire semi-finished structure.

In the representation of FIG. 2, the semi-finished textile product chamber C is enclosed by the membrane 11 and a section of a support profile 3 for the semi-finished textile product 5 and is situated within the semi-finished prepreg product chamber B. The membrane 11 is made of one part thereby and closed by sealing elements 32a, 32b, and 32c after insertion of the dry semi-finished textile product 5. The sealing elements 32a, 32b, and 32c thereby rest against parts of the semi-finished textile product 5, the semi-finished prepreg product 2 or the support profile 3, so that the foil 11 together with these elements in some sections form a delimitation of the semi-finished textile product chamber C. Alternatively, the membrane 11 can also completely enclose the semi-finished textile product chamber C or be sealed in another way by corresponding sealing elements on surfaces of the semi-finished textile product 5, the semi-finished prepreg product 2 or a support profile 3 or other auxiliary devices.

In the embodiment according to FIG. 2, the membrane 13 for enclosing the prepreg chamber B is formed in two parts 13a, 13b that are tightly joined by a sealing element 35. In the representation of FIG. 2, the membrane 13b is located on a tool support 30.

The sealing of the chambers A, B, and C per se and relative to adjacent chambers can be achieved in various ways. It is essential in the embodiment of FIGS. 1 and 2 that the prepreg chamber B is located against the semi-finished textile product chamber C, at least in some areas, in an air-permeable and not necessarily a resin-permeable manner; and that the semi-finished textile product chamber C is located against the aeration and deaeration chamber A by a membrane whereby there is a device provided for feeding the resin into the semi-finished textile product chamber C through an air-impermeable area of the chamber, whereby due to the air-permeable membranes between the chambers A and B as well as between the chambers A and C, a vacuum in the aeration and deaeration chamber A generates a vacuum in the prepreg chamber B as well as in the semi-finished textile product chamber C. The membrane 13 and optionally the membrane 15 can be resin-permeable or resin-impermeable. In general, the chamber C at least in sections stands in exchange with the chamber B, whereby the chamber C can also be surrounded completely by the chamber B with regard to the position of the chamber A. In the latter case, the membrane 15 can be omitted. Accordingly, at least the chamber B allows air exchange with the chamber A via the membrane 13.

Alternatively or additionally to the membrane between the semi-finished textile product chamber C and the aeration and deaeration chamber A, a wall with openings or valves can also be provided.

Of course, it should also be apparent that the semi-finished prepreg product can also be used for a stiffening element and the dry semi-finished textile product can also be used for a planking element.

In one or more of the chambers A, B, C a flow promoter 7, 10 or 12 can be arranged in sections. This flow promoter runs in the chamber A in sections between the foil 8 and the membrane 13 as well as optionally between the foil 8 and the membrane 15. A flow promoter can also be located in sections between the prepreg semi-finished product 2 or the textile semi-finished product 5 and a respective membrane running along the corresponding semi-finished product surface. At points at which membranes (11 and 13 in FIG. 2) run along towards one another, a flow promoter (10 in FIG. 2) can be located between these membranes. In principle, a flow promoter can be located in sections on a surface of the textile semi-finished product or the prepreg semi-finished product.

Figure 3:
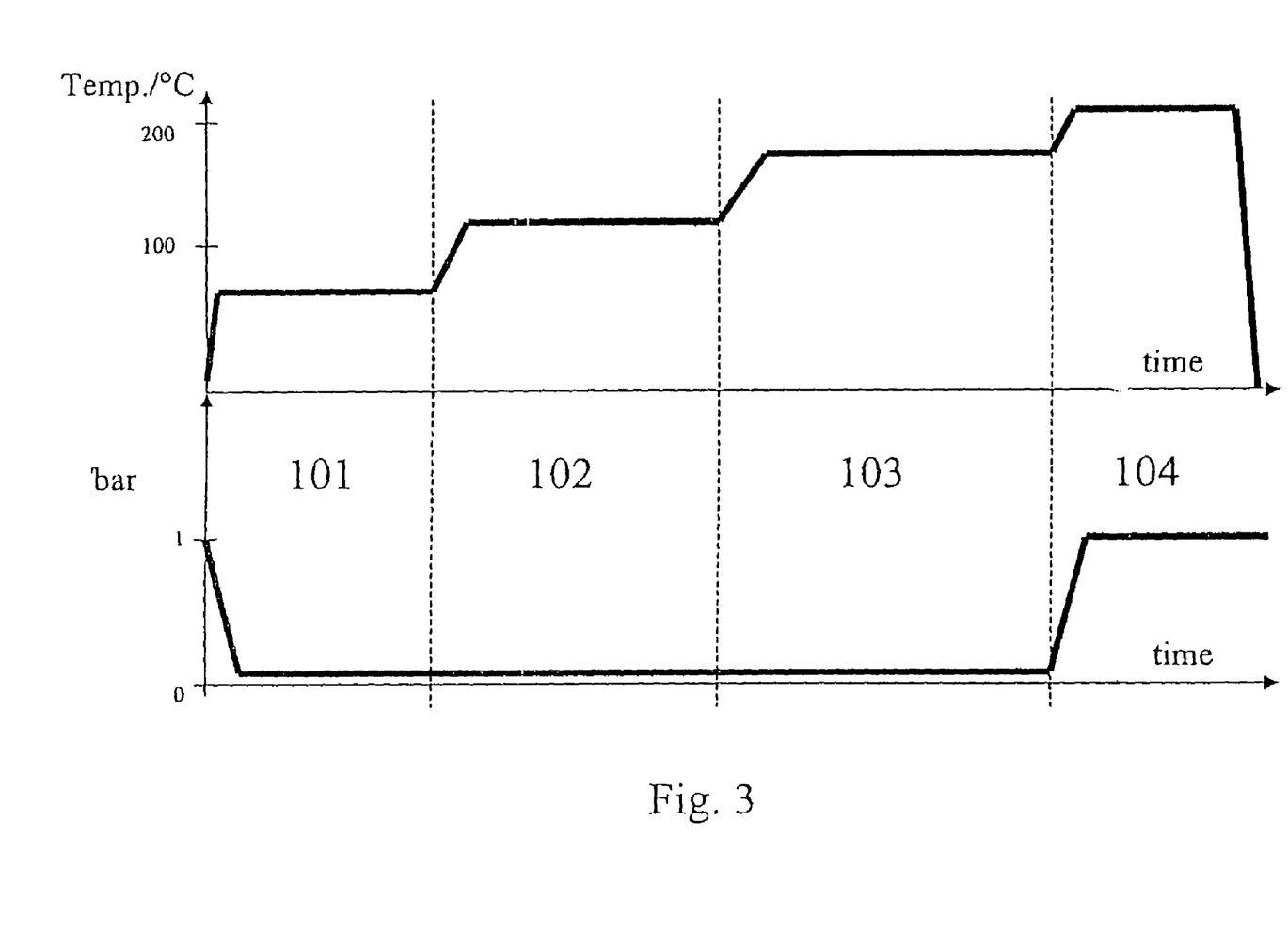
FIG. 3 is an example of a temperature and vacuum sequence for carrying out the method according to an exemplary embodiment of the invention.

FIG. 3 shows a typical temperature and vacuum sequence. The sequence is composed in principle of four phases: an injection phase 101, an intermediate curing phase 102, a curing phase 103, and a tempering phase 104.

The vacuum is preferably constantly applied over phases 101 through 103, whereby the vacuum is typically applied in the order of magnitude of 20 mbar.

The vacuum is no longer necessary in the tempering phase 104, but an applied vacuum can be advantageous for the component quality.

In the injection phase 101 in which typically temperatures of approximately 85° C. are adjusted depending on the viscosity of the injection resin, a vacuum is produced in chamber C through the vacuum applied in chamber A. The air escapes from the chamber A through the exhaust line 25. The semi-finished textile products in chamber C are impregnated with the injection resin (e.g., RTM 6). Through the vacuum applied in chamber C the fiber materials in chambers C and B are compressed.

Optionally from this stage onwards, an excess pressure (e.g., 2.5 to 10 bar) can be applied up to the end of phases 103 or 104 by an autoclave.

Heating of the chambers B and C to temperatures of, e.g., 100 to 140° C. occurs in phase 102. A chemical reaction is thus started in the two resin systems (chamber B=prepreg, chamber C=liquid resin). Determined by the chemical behavior of epoxy resins, the viscosity now drops again, so that an ideal distribution of the resin systems within the fiber materials occurs in particular in chamber B.

After a time determined by the resin systems (typically 1 to 2 hours) a heating of chambers B and C takes place in the curing phase 103 that has to be designed so that the temperatures are sufficient for the final curing of the resin system (typically 160 to 180° C., approx. 1-2 hours). If it is advantageous for one of the resin systems, an additional tempering (thermal after treatment) takes place at, e.g., 180-210° C. Neither a vacuum nor an autoclave pressure is absolutely essential hereby, but can be provided.

The method makes it possible to meet typical requirements for component quality for use as aviation components, such as, e.g., lack of pores, fiber volume content at 60%, component dimensions, and interior laminate qualities.

The method parameters cited above are given by way of example for a typical 180° C. prepreg system in combination with a liquid resin system. With other permissible and conceivable material combinations, they have to be respectively adjusted. The size of the components to be produced is virtually limitless, if an excess pressure is not necessary with a certain material combination.

The semi-finished products 2, 5 can form a delimitation in sections of the chambers A, B, C. Thus, the semi-finished prepreg product can partly be a delimitation of the prepreg chamber B from the semi-finished textile product chamber C (FIG. 2). In this case, an edge area of the membrane 11 is fixed on the semi-finished prepreg product 2 via a seal 32b.

According to the invention therefore for the production of a fiber composite component in which a semi-finished prepreg product 2 is joined together with a semi-finished textile product 5, the following is provided: A method for producing fiber-reinforced plastic components comprising several semi-finished products, in which the semi-finished products are arranged in a chamber into which resin can be inserted and in which an aeration and deaeration chamber A is provided that is delimited from the surroundings with a gas-impermeable foil, from which chamber A gas can be withdrawn by use of an exhaust line 25. The method includes positioning of a semi-finished prepreg product 2 and a dry semi-finished textile product 5 in such a way that the semi-finished products lie adjacent to one another in sections. The method further including formation of a chamber B around a semi-finished prepreg product (2) by use of a gas-permeable membrane (13) that surrounds the chamber (B) at least partly. The method further including formation of a chamber C around a dry semi-finished textile product 5 by a gas-permeable membrane 11 that surrounds the chamber C at least partly and that adjoins the chamber B with the semi-finished prepreg product 2 at least in sections, whereby an injection line 20 for injecting resin opens into the chamber C with the semi-finished textile product 5. The also including formation of the aeration and deaeration chamber A, which is sealed gastight against the surroundings by a foil 8 and that in sections is bounded by the membrane 13 surrounding the chamber B with the semi-finished prepreg product 2, whereby a gas exhaust line 20 opens into the chamber C with the semi-finished textile product 5, so that when air is suctioned out of the aeration and deaeration chamber A, air is removed from the chamber B with the semi-finished prepreg product 2 as well as from the chamber C with the semi-finished textile product 5. The method can also include an injection of resin into the semi-finished textile product chamber C, and evacuation of the aeration and deaeration chamber A, so that the semi-finished textile product chamber C is evacuated on the path via the semi-finished prepreg product chamber B to the aeration and deaeration chamber A, and curing of the arrangement of semi-finished prepreg product 2 and semi-finished textile product 5 according to a predetermined temperature course and vacuum course, in order to join the semi-finished prepreg product 2 and the semi-finished textile product 5 together.

In the method according to the present invention, the semi-finished textile product chamber C can be arranged inside the semi-finished prepreg product chamber B and be enclosed by it, and the semi-finished prepreg product chamber B in turn can be arranged inside the aeration and deaeration chamber A and be enclosed by it.

Alternatively, in the method according to the invention the semi-finished textile product chamber C and the aeration and deaeration chamber A can adjoin each other in sections via a gas-permeable membrane 15, so that the semi-finished prepreg product chamber B and the semi-finished textile product chamber C respectively can be evacuated directly to the aeration and deaeration chamber A.

In the method according to the invention, the semi-finished prepreg product 5 can be provided as an integral stiffening of the fiber-reinforced plastic component to be produced.

In the present invention the semi-finished textile product 5 and at least the part of the semi-finished prepreg product 2 to be joined to the semi-finished textile product 5 are enclosed by a semi-finished textile product chamber C limited at least partly by a membrane 11. The at least the part of the semi-finished prepreg product 2 not enclosed by the semi-finished textile product chamber C is enclosed by a semi-finished prepreg product chamber B limited at least partly by a membrane 13.

Furthermore, according to the present invention a device for producing fiber-reinforced plastic components comprising a semi-finished prepreg product 2 and a semi-finished textile product 5 is provided, with an aeration and deaeration chamber A sealed airtight against the surroundings in particular by an air-impermeable foil, which chamber A surrounds the semi-finished prepreg product 2 and the semi-finished textile product 5 and can be evacuated via an exhaust line 25, with an arrangement of a semi-finished prepreg product 2 and a dry semi-finished textile product 5 in which the semi-finished products lie adjacent to one another in sections. The present invention also includes a chamber B around the semi-finished prepreg product 2 by a gas-permeable membrane 13 that surrounds the chamber B at least partly, and a chamber C around a dry semi-finished textile product 5 by a gas-permeable membrane 11 that surrounds the chamber C at least partly and that adjoins the chamber B with the semi-finished prepreg product 2 at least in sections, whereby an injection line 20 for injecting resin opens into the chamber C with the semi-finished textile product 5, an aeration and deaeration chamber A that is sealed gastight from the surroundings by a foil 8 and that is bounded in sections by the membrane 13 surrounding the chamber B with the semi-finished prepreg product 2, whereby a gas exhaust line 20 opens into the chamber C with the semi-finished textile product 5, so that when air is suctioned out of the aeration and deaeration chamber A, air is withdrawn from the chamber B with the semi-finished prepreg product 2 as well as from the chamber C with the semi-finished textile product 5.

In the device one or more of the membranes 11, 13, 15 can be resin-impermeable or resin-permeable. The semi-finished textile product chamber C can be arranged inside the semi-finished prepreg product chamber B and be enclosed by it. The semi-finished textile product chamber C can be limited partly by the semi-finished prepreg product 2.

What is claimed is:

1. A method for producing fiber-reinforced plastic components composed of a semi-finished prepreg product and a dry semi-finished textile product, the method comprising:
    enclosing the semi-finished prepreg product and the dry semi-finished textile product within an air-impermeable foil to form an aeration and deaeration chamber;
    enclosing the dry semi-finished textile product and at least a part of the semi-finished prepreg product to be joined to the dry semi-finished textile product in a semi-finished textile product chamber limited at least in part by a gas-permeable and resin-impermeable membrane; and
    enclosing at least a part of the semi-finished prepreg product not enclosed by the semi-finished textile product chamber in a semi-finished prepreg product chamber limited at least in part by a second gas-permeable and resin-impermeable membrane.

2. The method according to claim 1, further comprising:
    curing the semi-finished prepreg product and the dry semi-finished textile product to join the semi-finished prepreg product to the dry semi-finished textile product.

3. The method according to claim 1, further comprising:
    injecting resin into the semi-finished textile product chamber; and
    evacuating the semi-finished textile product chamber and the semi-finished prepreg product chamber through the aeration and deaeration chamber.

4. The method according to claim 1, wherein the semi-finished textile product chamber is evacuated through the aeration and deaeration chamber through the semi-finished prepreg product chamber.

5. The method according to claim 4, wherein the semi-finished textile product chamber and the semi-finished prepreg product chamber are respectively limited at least in part by the aeration and deaeration chamber.

6. The method according to claim 1 further comprising:
    evacuating the semi-finished textile product chamber and the semi-finished prepreg product chamber directly through the aeration and deaeration chamber.

7. The method according to claim 1, wherein the semi-finished textile product chamber is arranged within the semi-finished prepreg chamber and is enclosed by the semi-finished prepreg chamber, and that the semi-finished prepreg product chamber is arranged within the aeration and deaeration chamber and is enclosed by the aeration and deaeration chamber.

8. The method according to one of claim 1, wherein the semi-finished textile product chamber is limited in part by the semi-finished prepreg product.

9. The method according to claim 1, wherein the fiber-reinforced plastic component is integrally stiffened by the dry semi-finished textile product.

10. The method according to claim 1, wherein the fiber-reinforced plastic component is integrally stiffened by the semi-finished prepreg product.

11. The method according to claim 1, further comprising:
    curing the resin under pressure in an autoclave.

12. A method for producing fiber-reinforced plastic components composed of a semi-finished prepreg product and a dry semi-finished textile product with an aeration and deaeration chamber having an exhaust line, a prepreg chamber, and a semi-finished textile product chamber having an injection line for inserting resin, the method comprising:
    positioning the semi-finished prepreg product relative to the dry semi-finished textile product to form a predetermined shape of the plastic component to be produced;
    arranging gas permeable membranes and a vacuum foil to form the semi-finished textile product chamber, the prepreg chamber and the aeration and deaeration chamber respectively, wherein each of the chambers is respectively sealed by a sealing element; and
    producing a vacuum in the aeration and deaeration chamber through the exhaust line.

13. The method according to claim 12, further comprising:
    injecting resin into the semi-finished textile product chamber.

14. The method according to claim 13, further comprising:
    curing the semi-finished prepreg product and dry semi-finished textile product according to a predetermined temperature and vacuum sequence.

15. The method according to claim 12, wherein the semi-finished textile product chamber is evacuated through the aeration and deaeration chamber through the semi-finished prepreg product chamber.

16. A method of producing an aircraft component using the production device for producing fiber-reinforced plastic components that includes a semi-finished textile product chamber that receives a dry semi-finished textile product, the semi-finished textile product chamber being formed by a gas permeable membrane, an injection line structured and arranged to insert resin into the semi-finished textile product chamber, a semi-finished prepreg chamber that receives a semi-finished prepreg product, the semi-finished prepreg chamber being formed by a second gas permeable membrane, an aeration and deaeration chamber that is structured and arranged to enclose the semi-finished textile product chamber and the semi-finished prepreg chamber, and an exhaust line that is structured and arranged to produce a vacuum in the aeration and deaeration chamber, the method comprising:
    evacuating the aeration and deaeration chamber so that the semi-finished textile product chamber is evacuated through the semi-finished prepreg product chamber to the aeration and deaeration chamber, wherein each of the chambers is sealed by a sealing element.

17. A method for producing fiber-reinforced plastic components, the method including:
    positioning a semi-finished prepreg product and a dry semi-finished textile product such that the semi-finished products are adjacent to one another;
    forming a semi-finished prepreg product chamber around the semi-finished prepreg product with a gas-permeable membrane that at least partially surrounds the semi-finished prepreg product chamber;
    forming a semi-finished textile product chamber around the dry semi-finished textile product with a second gas-permeable membrane that at least partially surrounds the semi-finished textile product chamber and that adjoins the semi-finished prepreg product chamber;
    forming an aeration and deaeration chamber which is sealed gastight from the surroundings by a foil;
    injecting resin into the semi-finished textile product chamber; and
    evacuating the aeration and deaeration chamber so that the semi-finished textile product chamber is evacuated through the semi-finished prepreg product chamber to the aeration and deaeration chamber, wherein each of the chambers is sealed by a sealing element.

18. The method according to claim 17, further comprising: curing the semi-finished prepreg product and dry semi-finished textile product according to a predetermined temperature course and vacuum course in order to join the semi-finished prepreg product and the dry semi-finished textile product together.

19. The method according to claim 18, wherein the curing of the resin is carried out additionally under pressure in an autoclave.

20. The method according to claim 17, wherein the semi-finished textile product chamber is arranged inside and is enclosed by the semi-finished prepreg product chamber, and that the semi-finished prepreg product chamber is arranged inside and is enclosed by the aeration and deaeration chamber.

21. The method according to claim 17, wherein the semi-finished textile product chamber and the aeration and deaeration chamber adjoin each other in sections through a gas-permeable membrane, so that the semi-finished prepreg product chamber and the semi-finished textile product chamber respectively are evacuated directly to the aeration and deaeration chamber.

22. The method according to claim 17, wherein the semi-finished prepreg product is an integral stiffening of the fiber-reinforced plastic component to be produced.

23. The method according to claim 17, wherein the dry semi-finished textile product and at least the part of the semi-finished prepreg product to be joined to the dry semi-finished textile product are enclosed by a semi-finished textile product chamber limited at least partly by a membrane and that at least a part of the semi-finished prepreg product not enclosed by the semi-finished textile product chamber is enclosed by a semi-finished prepreg product chamber limited at least partly by a membrane.

24. The method according to claim 17, wherein at least one of the membranes is resin-impermeable.

25. The method according to claim 17, wherein at least one of the membranes is resin-permeable.

* * * * *